2,985,508

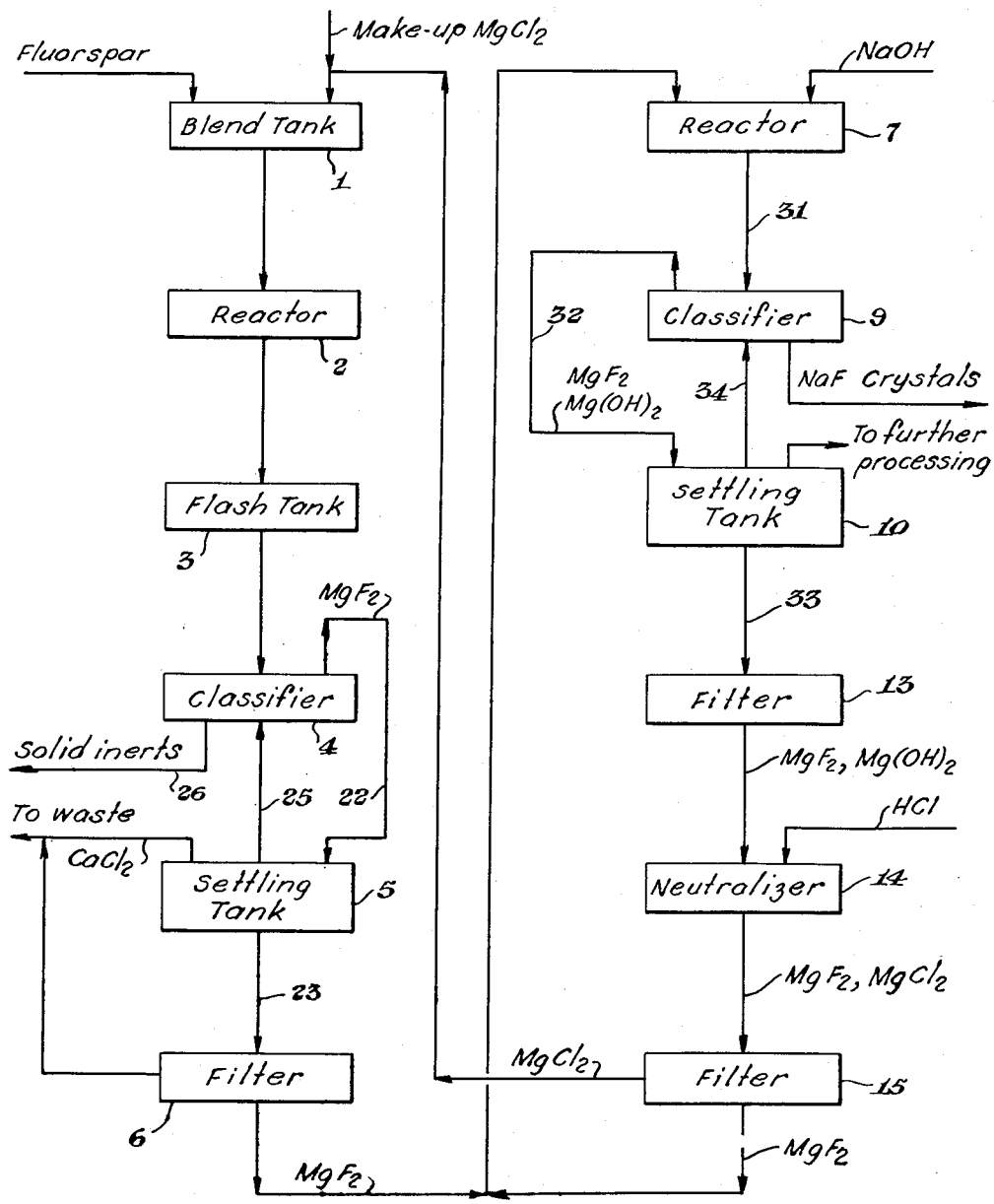

MANUFACTURE OF METAL FLUORIDES

Robert E. Fredrickson, Lake Jackson, William A. Mod, Freeport, and Bob R. Harrell, Lake Jackson, Tex., assignors to The Dow Chemical Company, Midland, Mich., a corporation of Delaware Filed Jan. 7, 1957, Ser. No. 632,720

18 Claims. (Cl. 23—88)

This invention relates to an improved process for preparation of metal fluorides.

In recent years the demand for metal fluorides has increased considerably. Industry with the present methods of manufacturing these fluorides has been slow in meeting this growing demand. The majority of the processes used for the preparation of the fluorides require expensive specialized equipment, because hydrogen fluoride is used. Since these processes depend upon hydrogen fluoride production, the preparation of these salts is expensive and the ability of the industry to expand rapidly to meet the demand is greatly limited. To overcome these disadvantages, a number of processes have been described whereby metal fluorides can be made without the use of hydrogen fluoride. By these methods it is practically impossible to produce metal fluorides free from other reaction products due to separation difficulties. These processes are not adaptable for preparation of metal fluorides for general use and are limited to the manufacture of metal fluorides for a particular purpose where the impurities are not detrimental. A process wherein easily recoverable metal fluorides, suitable for general use, could be made without depending upon the production of hydrogen fluoride would aid in meeting the growing demand for relatively pure metal fluorides.

According to the invention, easily recoverable metal fluorides are economically manufactured by reacting calcium fluoride with magnesium chloride to prepare magnesium fluoride and reacting the magnesium fluoride with a strongly alkaline metal hydroxide to form the metal fluoride. Also magnesium hydroxide is produced which can be reacted with hydrogen chloride to form additional magnesium chloride which may be recycled. The reactions involved in this process may be illustrated by the following formulae:

(1) $MgCl_2 + CaF_2 \rightarrow MgF_2 + CaCl_2$
(2) $nMgF_2 + 2M(OH)_n \rightarrow 2MF_n + Mg(OH)_2$
(3) $2HCl + Mg(OH)_2 \rightarrow MgCl_2 + 2H_2O$ where in Equation 2 M is a metal forming a strongly alkaline hydroxide and $n$ is the valence of the metal M, either 1 or 2.

In the improved process of the present invention, hydrogen fluoride is not used. Since relatively expensive equipment is not required, the production of the fluoride can be readily increased whenever there is a demand. The fluorides made by the process can be easily separated in crystalline state from the reaction products by classification. Usually, since the product is obtained in a crystalline state, further purification is not necessary to make the product satisfactory for commercial use. In this process dilute solutions of the alkaline hydroxide can be used. With the exception of potassium hydroxide, impurities in the dilute solutions, such as those found in an effluent of an electrolytic chlorine cell, do not materially affect the purity or the recovery of the fluoride product. The ability to use these available dilute impure solutions is particularly advantageous economically.

The new improved process can be used for manufacturing fluorides of any metal which forms a strongly alkaline hydroxide, such as, for example, sodium, potassium, lithium, barium, strontium, etc. It is possible to manufacture the metal fluorides by using only the reactions indicated by the first two equations. However, the economy of the process is considerably improved by combining the third reaction with the first two. Relatively pure metal fluorides are made by utilizing the physical characteristics of the magnesium fluoride and magnesium hydroxide precipitates to effect the separations of these precipitates by a mechanical means from the liquid and other solids in the reaction mixtures. By reacting calcium fluoride from sources, such as fluorspar, with magnesium chloride under specified conditions, a precipitate of magnesium fluoride is obtained which can be easily separated from any unreacted calcium fluoride or solid inerts present as well as from the remaining solution. In the reactions of magnesium fluoride with alkaline metal hydroxides, the metal fluorides obtained, with the exception of potassium fluoride, have a relatively low solubility in the reaction products. They are crystalline in form and are readily separable from the magnesium hydroxide and the other reaction products. With metal fluorides which are soluble, such as potassium fluoride, the solution of the fluoride is recovered by filtration and then further processed, as by evaporation, to obtain the free salt.

In describing the process, the individual reactions will be first discussed and then an application of the process to the preparation of sodium fluoride as shown diagrammatically by the attached drawing will be described.

In reacting the magnesium chloride with calcium fluoride, a magnesium chloride solution containing not greater than 30 weight percent of magnesium chloride must be used in order to obtain a magnesium fluoride precipitate which can be separated from the reaction mixture. To effect the separation, it is necessary to obtain a precipitate which can be easily separated from the solids in the reaction mixture and still be readily filterable to recover it from the resulting calcium chloride solution. Dilute solutions of magnesium chloride will give a magnesium fluoride product which is more readily separable than the product obtained with more concentrated solutions. As the concentration of the magnesium chloride solution used is increased, the precipitate of magnesium fluoride obtained has a greater tendency to adhere to inert solids in the reaction mixture and also to form a more impervious filter cake. The effect of the concentration of the magnesium chloride solution in producing the difficultly separable form of magnesium fluoride is only gradual when the concentration is increased from around 10 to 28 percent. At concentrations above 28 percent, a small increase in the concentration will profoundly affect the magnesium fluoride product obtained making it impractical to use a concentration containing more than 30 weight percent magnesium chloride. Further, attempts to obtain a high conversion of calcium fluoride with solutions greater than 30 weight percent may result in obtaining a cement-type product which adheres to the walls of the reactor and can only be removed by chipping.

Since in the reaction of calcium fluoride from sources, such as fluorspar, the unreacted calcium fluoride is discarded with the reaction mixture solids, a high conversion of calcium fluoride is desirable. The conversion of calcium fluoride depends upon the reaction temperature and the excess of magnesium chloride used. A high reaction temperature in the range of 200 to 270° C., preferably around 250° C., is generally employed to obtained these high conversions of the calcium fluoride without having to use an unduly large excess of magnesium chloride. Although a more easily separable product is obtained with the more dilute solutions of magnesium chloride, a greater excess of this solution is required. Thus, a practical lower limit of the magnesium chloride solutions that may be employed is around 10 weight percent. With solutions in the range of 10 to 30 weight percent of magnesium chloride, preferably in the range of 18 to 22 weight percent, substantially complete conversion of the calcium fluoride may be realized with a stoichiometric excess of the magnesium chloride solution in the range of 15 to 25 percent. Without the excess, conversions of only about 75 to 80 percent are obtained.

Since the reaction is carried out in an aqueous medium at temperatures in the range of 230 to 270°, sufficient pressure must be used to maintain the mixture in liquid phase. To keep the water from vaporizing at these temperatures, a pressure in the range of 450 to 800 pounds per square inch is generally required.

The reaction time necessary to obtain a substantially complete conversion of the calcium fluoride in the fluorspar depends upon the particle size of the fluorspar used in the reaction. The fluorspar is usually ground to pass through a 200 mesh screen, which permits a good contact of the calcium fluoride with the magnesium chloride in the reaction slurry, and requires a reaction time of from 15 to 30 minutes to substantially convert all of the calcium fluoride. When the fluorspar is not ground to as fine a particle size, a longer reaction time is required.

While other mechanical methods may be used to effect the separation of magnesium fluoride from the reaction products, generally the magnesium fluoride is separated from the inerts and other solids present in the reacted mixture by elutriation and recovered from the calcium chloride solution by settling and filtration.

The reaction of magnesium fluoride with the alkaline hydroxide can be carried out in a stirred reactor under atmospheric pressure. For the reactions of the alkaline hydroxide which will form metal fluorides insoluble in the reaction mixture, at least a stoichoimetric amount of magnesium fluoride must be used in order to obtain a practical conversion of the magnesium fluoride. Preferably, a 50 to 200 percent stoichiometric excess of magnesium fluoride is used. When slightly less than stoichiometric amounts are used, less than ½ of the alkaline hydroxide will react. With a stoichiometric amount of magnesium fluoride, around 60 percent of the hydroxide will be converted, while with a 50 percent stoichiometric excess, 88 percent, and with a 200 percent excess, 98 percent conversion is obtained. With alkaline hydroxides which will form metal fluorides soluble in the reaction mixture, such as potassium fluoride, at least a stoichiometric amount of the hydroxide is required. It is preferred to use a stoichiometric excess of the hydroxide in the range of 50 to 150 percent instead of an excess of magnesium fluoride. With the excess hydroxide substantially complete conversion of the magnesium fluoride to the metal fluoride can be obtained.

Although the concentration of the alkaline hydroxide used is not critical, it is preferred to use a solution containing at least 8 percent by weight of the hydroxide. In the manufacture of metal fluorides which are insoluble in the reaction mixture, a relatively impure hydroxide may be used, for example, in the preparation of sodium fluoride, effluent from an electrolytic cell is satisfactory. It is preferred to use a relatively pure alkaline hydroxide for the preparation of metal fluorides which are soluble, such as potassium fluoride, since any impurities in the hydroxide will be with the metal fluoride in the solution portion of the reacted mass and this may make it more difficult to recover a relatively pure product from the solution. The reaction between the alkaline hydroxide and the magnesium fluoride may be carried out at a temperature between 40° C. and the boiling point of the mixture, the optimum temperature being in the range of around 80° to 90° C. The reaction between the reactants is substantially complete in about 1 to 3 hours.

Separation of the metal fluorides from the magnesium hydroxide and the unreacted magnesium fluoride is readily accomplished. With the exception of potassium fluoride, the solubility of the metal fluoride is relatively low and crystals of the fluoride are formed which may be separated from the magnesium compounds by elutriation. The crystals may then be centrifuged, washed, and dried. The magnesium hydroxide and the unreacted magnesium fluoride can be concentrated in another settler and the underflow filtered to recover the magnesium compounds. Where the fluoride is soluble such as potassium fluoride, the metal fluoride solution portion of the reaction mass may be separated from the insoluble part by settling and filtration. The solution can then be evaporated to recover the fluoride salt by crystallization.

The magnesium hydroxide recovered from the above step may be neutralized with hydrochloric acid to convert the magnesium hydroxide to magnesium chloride. Unreacted magnesium fluoride which may be present is not adversely affected by the neutralization and may be separated from the resulting magnesium chloride solution by filtration and recycled back to the alkaline hydroxide reaction, if desired. Magnesium chloride obtained in the neutralization step may be recycled back to the first step to be reacted with more fluorspar. The solution obtained in this step is relatively dilute and may be used directly without further concentration or dilution, if desired.

The process may be more fully understood by referring to the accompanying drawing which illustrates diagrammatically an application of the improved process for manufacture of sodium fluoride.

Ground fluorspar and an aqueous magnesium chloride solution are added to blend tank 1 where the constituents are mixed by an agitator. From tank 1, the slurry is pumped to reactor 2. In the reactor the mixture is heated to a temperature from 230 to 270° C. under sufficient pressure to prevent substantial vaporization of the water present and reacted for about 15 to 30 minutes. From reactor 2, the reacted slurry is discharged to flash tank 3 where the pressure on the constituents is reduced to atmospheric pressure. The reduction in pressure will result in the vaporization of the water cooling the products before their introduction into classifier 4. To have a continuous process, a continuous reactor or more than one reactor may be used so that a continual flow to classifier 4 can be maintained. In classifier 4, the calcium chloride solution and the magnesium fluoride are separated from the inerts which were in the fluorspar by elutriation. The solids settle to the bottom of tank 4 and are discharged as underflow through line 26. The calcium chloride and the magnesium fluoride precipitate leave classifier 4 in the overflow and pass through line 22 to settling tank 5. In tank 5, the magnesium fluoride precipitate settling to the bottom is withdrawn through line 23 and recovered by filtering and washing in filter 6. The calcium chloride solution is removed from the settling tank as an overflow and discharged to waste with the filtrate from the filter. Some of the calcium chloride solution is recycled by line 25 to the bottom of classifier 4 where it provides the upward flow for the elutriation.

The reaction of magnesium fluoride with sodium hydroxide is carried out in reactor 7. When the desired amount of magnesium fluoride has been recovered by filter 6, it is introduced into reactor 7. The hydroxide containing about 8 to 10 percent by weight of sodium hydroxide is fed to the reactor. The reactants are agitated and reacted at 80° C. for a length of time of 1 to 3 hours. The effluent from reactor 7 is discharged through line 31 to classifier 9 where by using elutriation the sodium fluoride crystals settle to the bottom of the tank to be removed as underflow. These crystals may then be further processed by centrifuging, washing, and drying. The magnesium hydroxide, the unreacted magnesium fluoride, and the remaining solution are removed as overflow and passed through line 32 to settling tank 10. The magnesium hydroxide and the unreacted magnesium fluoride settle to the bottom of tank 10 and are withdrawn through line 33 as a slurry to be filtered in filter 13. Part of the solution removed as overflow from settling tank 10 is recycled through line 34 to provide the upward flow for the elutriation in classifier 9, while the remaining overflow with the filtrate from filter 13 is discharged to waste or to further processing to recover the small amount of the metal fluoride dissolved in the solution.

The magnesium hydroxide and the unreacted magnesium fluoride from filter 13 is charged to neutralization tank 14 to which sufficient amount of hydrochloric acid is added to neutralize the magnesium hydroxide. The effluent from the neutralizer is passed to filter 15 where the magnesium fluoride is separated from the magnesium chloride solution and returned to reactor 7. The magnesium chloride solution obtained is recycled to blend tank 1 where it can be intermixed with more fluorspar to be reacted.

It is evident that this improved process may be applied in other ways than shown by the drawing. Different types of equipment may be employed and the separation of the products may be made by other methods.

The following examples further illustrate the invention but are not to be construed as limiting the invention thereto.

*Example I*

A series of runs were made where magnesium chloride was reacted with fluorspar in a 1 liter pressure reactor equipped with an agitator. The concentration and amount of the magnesium chloride solution used were varied with each run. The reactions were carried out at a temperature of 250° C. and under sufficient pressure to maintain the reaction mixture in liquid phase. Pressure employed varied with the concentration of the magnesium chloride solution used and was in the range of 450 to 600 pounds per square inch.

In the runs, the reactor was charged with 100 grams of fluorspar, ground to pass through a 200 mesh screen and containing 97.7 weight percent of calcium fluoride, and with the magnesium chloride solution. The resulting slurry was agitated, heated to 250° C., and maintained at this temperature for 20 minutes. Then it was cooled, filtered, and washed. The filtrate and the wash water were combined and the solution analyzed for calcium from which the calcium fluoride conversion was determined. Results obtained are shown in the table below.

| Conc. of MgCl$_2$ Solution, Weight Percent | Stoichiometric Excess of MgCl$_2$, Percent | Percent Conversion of CaF$_2$ to MgF$_2$ |
|---|---|---|
| 15 | 0 | 66.5 |
| 15 | 10 | 74.5 |
| 15 | 20 | 86.8 |
| 15 | 25 | 99.2 |
| 22 | 0 | 68.3 |
| 22 | 10 | 86.0 |
| 22 | 20 | 92.1 |
| 22 | 25 | 97.0 |
| 34 | 0 | 74.5 |
| 34 | 15 | 92. |
| 34 | 20 | Cement type product |

The magnesium fluoride obtained from the run using a 25 percent stoichiometric excess of a magnesium chloride solution containing 15 weight percent of magnesium chloride was reacted with effluent from an electrolytic chlorine cell containing 8.7 weight percent of sodium hydroxide. A series of runs were made at atmospheric pressure using different ratios of the reactants.

In the runs, 362 grams of the chlorine cell effluent was added to a stirred reactor. For each run a different amount of magnesium fluoride was also added to the reactor in form of a dry filter cake containing 97 weight percent of magnesium fluoride. The mixture was heated to 68° C. and maintained at this temperature for 2 hours. Then it was filtered to separate the solids. The filtrate was analyzed for sodium hydroxide and the conversion of the hydroxide was calculated. Results obtained are given in the table below:

| Moles of MgF$_2$ per mole of NaOH | Percent Conversion of NaOH to NaF |
|---|---|
| 0.45 | 45.5 |
| 0.50 | 50.5 |
| 0.55 | 70.5 |
| 0.75 | 87.0 |
| 1.00 | 91.0 |
| 1.25 | 96.4 |
| 1.50 | 98.0 |

*Example II*

Barium hydroxide was reacted with magnesium fluoride in a closed glass reactor equipped with a stirrer.

To the reactor were added 100 grams of a 10 percent by weight of barium hydroxide aqueous slurry and 3.6 grams of a filter cake containing 80 percent by weight of magnesium fluoride and the remainder water. The mixture was heated to about 80° C. and reacted at this temperature for 1 hour. The resulting mixture was filtered while hot. Analysis of the filtrate and residue showed that 54.5 percent of the magnesium fluoride was converted to barium fluoride.

*Example III*

A run was made similar to that described in Example II except that strontium hydroxide was reacted instead of barium hydroxide.

To the reactor were added 103 grams of water, 11.47 grams of strontium hydroxide, and 5.27 grams of a filter cake containing 80 percent magnesium fluoride and the remainder water. This mixture was reacted in 90° C. for one hour. The resultant of slurry was filtered. Analysis of the residue showed that the major proportion of the hydroxide had been converted.

*Example IV*

A run was made similar to the one described in Example II except that lithium hydroxide was reacted in placed of barium hydroxide. To the reactor were added 90 grams of water, 10 grams of lithium hydroxide, and 13 grams of magnesium fluoride. The mixture was reacted at 90° for one hour and the resulting slurry was filtered while hot. Analysis of the filtrate show that 71 percent of the magnesium fluoride was converted to lithium fluoride.

*Example V*

A series of runs were made in a manner similar to that described in Example II. In the runs different amounts of potassium hydroxide was reacted with a given amount of magnesium fluoride.

To the reactor, 21 grams of a dry filter cake containing 97 weight percent of magnesium fluoride and a 10 weight percent potassium hydroxide were added. The mixture was heated to 90° C., reacted for 3 hours, and filtered while hot. The filtrate was analyzed to determine the percent of magnesium fluoride converted to potassium fluoride.

The results obtained are given below:

| Stoichiometric Ratio of KOH to MgF$_2$ | Percent Conversion of Magnesium Fluoride |
|---|---|
| 1:1 | 42.0 |
| 1.5:1 | 100.0 |
| 2:1 | 83.3 |

*Example VI*

A semi-continuous process similar to the one shown by the attached drawing was used in the preparation of sodium fluoride.

To a 1 liter pressure reactor equipped with an agitator, 100 grams of fluorspar containing 97.7 weight percent of calcium fluoride and 662 grams of an aqueous magnesium chloride solution containing 22 weight percent of magnesium chloride were added. The reactants were heated to 250° C. under a 600 pounds per square inch gauge pressure and reacted for 20 minutes.

After the reacted mass was cooled, the magnesium fluoride and calcium chloride solution were separated from the inerts of the fluorspar by elutriation in a laboratory settler. The laboratory settler consisted of a ⅞ inch I.D. tube which at the top was divergingly enlarged to 5½ inch I.D. An upward flow rate of 3.06 gallons per minute of the calcium chloride solution per square foot of cross sectional area was employed.

The magnesium fluoride product was separated from the calcium chloride solution by filtration, washed, and dryed. The product contained 97 weight percent of magnesium fluoride. Analysis of the filtrate for calcium indicated that 98 percent of the calcium fluoride in the fluorspar has been converted to magnesium fluoride.

The magnesium fluoride product obtained was placed in an open flask. Also, some recycle magnesium fluoride obtained in a previous run was added to give a total of 150 grams of magnesium fluoride. This combined product was mixed with 1100 grams of an electrolytic chlorine cell effluent containing 8.7 weight percent of sodium hydroxide, and reacted at 60° C. for 3 hours.

Separation of the resulting sodium fluoride from the magnesium hydroxide and the excess magnesium fluoride was effected in a settler consisting of a 2½ inch I.D. tube. An upward flow rate in the settler of 4.4 gallons per minute of the filtrate from the overflow per square foot of cross sectional area was used. Analysis of the filtrate indicated that 98 percent of the sodium hydroxide was converted to sodium fluoride.

The magnesium hydroxide and the excess magnesium fluoride obtained in the overflow were reacted for one hour at room temperature with 439 grams of a hydrochloric acid solution containing 20 weight percent of hydrogen chloride. The resulting magnesium chloride was recycled to be reacted with more fluorspar and the magnesium fluoride was recycled to be reacted with more sodium hydroxide in a following run.

What is claimed is:

1. A process for the preparation of a metal fluoride from calcium fluoride, which comprises intermixing the calcium fluoride with an aqueous solution of magnesium chloride containing in the range of from 10 to 30 weight percent magnesium chloride to form a slurry, heating the slurry at a temperature in the range of 200° to 270° C. under sufficient pressure to prevent substantial vaporization of water from the slurry so as to convert the calcium fluoride to calcium chloride and the magnesium chloride to magnesium fluoride, separating the magnesium fluoride from the calcium chloride and inerts, intermixing the recovered magnesium fluoride with a hydroxide selected from the group consisting of sodium hydroxide, lithium hydroxide, potassium hydroxide, strontium hydroxide and barium hydroxide to convert the magnesium fluoride and the hydroxide to magnesium hydroxide and a metal fluoride, and recovering the metal fluoride from the reacted mixture.

2. A process for the preparation of a metal fluoride from fluorspar, which comprises intermixing ground fluorspar with a 15 to 25 percent stoichiometric excess of an aqueous magnesium chloride solution containing from 10 to 30 weight percent magnesium chloride to form a slurry, heating the slurry at a temperature in the range of 200° to 270° C. under sufficient pressure to prevent substantial vaporization of water from the slurry so as to convert the calcium fluoride in the fluorspar to calcium chloride and the magnesium chloride to magnesium fluoride, separating the magnesium fluoride from the calcium chloride and inerts, intermixing the recovered magnesium fluoride with a hydroxide selected from the group consisting of sodium hydroxide, a lithium hydroxide, barium hydroxide, and strontium hydroxide, to convert the magnesium fluoride and the hydroxide to magnesium hydroxide and a metal fluoride, and recovering the metal fluoride from the reacted mixture.

3. A process for the preparation of a metal fluoride from fluorspar, which comprises intermixing ground fluorspar with a 15 to 25 percent stoichiometric excess of an aqueous magnesium chloride solution containing from 10 to 30 weight percent magnesium chloride to form a slurry, heating the slurry at a temperature in the range of 200° to 270° C. under sufficient pressure to prevent substantial vaporization of water from the slurry so as to convert the calcium fluoride in the fluorspar to calcium chloride and the magnesium chloride to magnesium fluoride, separating the magnesium fluoride from the calcium chloride and inerts, intermixing the recovered magnesium fluoride with a hydroxide selected from the group consisting of sodium hydroxide, lithium hydroxide, barium hydroxide, and strontium hydroxide, in proportions such that the amount of magnesium fluoride is in the range of a stoichiometric amount to a 200 percent stoichiometric excess to convert the magnesium fluoride and the hydroxide to magnesium hydroxide and a metal fluoride, recovering the metal fluoride from the reacted mixture, separating the magnesium hydroxide and the unreacted magnesium fluoride from the metal fluoride-free reaction mixture, adding hydrochloric acid to the separated magnesium hydroxide and unreacted magnesium fluoride to convert the magnesium hydroxide to a magnesium chloride solution, separating the unreacted magnesium fluoride from the resulting magnesium chloride solution, returning the magnesium fluoride to be intermixed with additional hydroxide, and returning the resulting magnesium chloride solution to be mixed with more fluorspar.

4. A process for the preparation of a metal fluoride from fluorspar, which comprises intermixing ground fluorspar with a 15 to 25 percent stoichiometric excess of an aqueous magnesium chloride solution containing from 18 to 22 weight percent magnesium chloride to form a slurry, heating the slurry at a temperature of around 250° C. under sufficient pressure to prevent substantial vaporization of water from the slurry so as to convert the calcium fluoride in the fluorspar to calcium chloride and the magnesium chloride to magnesium fluoride, separating the magnesium fluoride from the calcium chloride and inerts, intermixing the recovered magnesium fluoride in a 50 to 200 percent stoichiometric excess with an aqueous solution containing at least 8 percent by weight of a hydroxide selected from the group consisting fo sodium hydroxide, lithium hydroxide, barium hydroxide, and strontium hydroxide at a temperature between 40° C. and the boiling point of the mixture to react the magnesium fluoride and the hydroxide to form magnesium hydroxide and a metal fluoride, recovering the metal fluoride from the reacted mixture, separating the magnesium hydroxide and the unreacted magnesium fluoride from the metal fluoride-free reaction mixture, adding hydrochloric acid to the separated magnesium hydroxide and magnesium fluoride to convert the magnesium hydroxide to a magnesium chloride solution, separating the unreaceted magnesium fluoride from the magnesium chloride solution, returning the magnesium fluoride to be intermixed with additional hydroxide, and returning the resulting magnesium chloride solution to be mixed with more fluorspar.

5. A process for the preparation of a metal fluoride from fluorspar, which comprises intermixing ground fluorspar with a 15 to 25 percent stoichiometric excess of an aqueous magnesium chloride solution containing from 18 to 22 weight percent magnesium chloride to form a slurry, heating the slurry at a temperature of around 250° C. under sufficient pressure to prevent substantial vaporization of water from the slurry so as to convert the calcium fluoride in the fluorspar to calcium chloride and the magnesium chloride to magnesium fluoride, separating the magnesium fluoride from the calcium chloride and inerts, intermixing the recovered magnesium fluoride in a stoichiometric excess in the range of 50 to 200 percent with an aqueous solution containing at least 8 percent by weight of a hydroxide selected from the group consisting of sodium hydroxide, lithium hydroxide, barium hydroxide, and strontium hydroxide at a temperature in the range of 80 to 90° C. to react the magnesium fluoride and the hydroxide to form magnesium hydroxide and a metal fluoride, recovering the metal fluoride from ther eacted mixture, separating the magnesium hydroxide and the unreacted magnesium fluoride from the metal fluoride-free reaction mixture, adding hydrochloric acid to the separated magnesium hydroxide and magnesium fluoride to convert the magnesium hydroxide to a magnesium chloride solution, separating the unreacted magnesium fluoride from the magnesium chloride solution, returning the magnesium fluoride to be intermixed with additional hydroxide, and returning the resulting magnesium chloride solution to be mixed with more fluorspar.

6. A process according to claim 5 wherein the hydroxide is sodium hydroxide.

7. A process according to claim 5 wherein the hydroxide is lithium hydroxide.

8. A process according to claim 5 wherein the hydroxide is barium hydroxide.

9. A process according to claim 5 wherein the hydroxide is strontium hydroxide.

10. A process for the preparation of potassium fluoride from calcium fluoride, which comprises intermixing calcium fluoride with a 15 to 25 percent stoichiometric excess of an aqueous magnesium chloride solution containing from 10 to 30 weight percent magnesium chloride to form a slurry, heating the slurry at a temperature in the range of 200° to 270° C. under sufficient pressure to prevent substantial vaporization of water from the slurry so as to convert the calcium fluoride in the fluorspar to calcium chloride and the magnesium chloride to magnesium fluoride, separating the magnesium fluoride from the calcium chloride and inerts, intermixing potassium hydroxide with the recovered magnesium fluoride to convert the magnesium fluoride and the potassium hydroxide to magnesium hydroxide and a potassium fluoride solution, separating the potassium fluoride solution from the magnesium hydroxide, and recovering the potassium fluoride from the solution.

11. A process for the preparation of potassium fluoride from fluorspar, which comprises intermixing ground fluorspar with a 15 to 25 percent stoichiometric excess of an aqueous magnesium chloride solution containing from 10 to 30 weight percent magnesium chloride to form a slurry, heating the slurry at a temperature in the range of 200° to 270° C. under sufficient pressure to prevent substantial vaporization of water from the slurry so as to convert the calcium fluoride in the fluorspar to calcium chloride and the magnesium chloride to magnesium fluoride, separating the magnesium fluoride from the calcium chloride and inerts, intermixing potassium hydroxide with the recovered magnesium fluoride to react the magnesium fluoride with the potassium hydroxide to form magnesium hydroxide and a potassium fluoride solution, separating the potassium fluoride solution from the magnesium hydroxide, recovering the potassium fluoride from the solution, adding hydrochloric acid to the magnesium hydroxide to convert the magnesium hydroxide to a magnesium chloride solution, and returning the magnesium chloride solution to be intermixed with more fluorspar.

12. A process for the preparation of potassium fluoride from fluorspar, which comprises intermixing ground fluorspar with a 15 to 25 percent stoichiometric excess of an aqueous magnesium chloride solution containing from 18 to 22 percent by weight of magnesium chloride to form a slurry, heating the slurry at a temperature of 200° to 270° C. under sufficient pressure to prevent substantial vaporization of water from the slurry so as to convert the calcium fluoride in the fluorspar to calcium chloride and the magnesium chloride to magnesium fluoride, separating the magnesium fluoride from the calcium chloride and inerts, intermixing the recovered magnesium fluoride with a stoichiometric excess in the range of 50 to 150 percent of an aqueous solution containing at least 8 percent by weight of potassium hydroxide at a temperature between 40° C. and a boiling point of the mixture to react the magnesium fluoride with the potassium hydroxide to form magnesium hydroxide and a potassium fluoride solution, separating the potassium fluoride solution from the magnesium hydroxide, recovering the potassium fluoride from the solution, adding hydrochloric acid to the magnesium hydroxide to convert the magnesium hydroxide to a magnesium chloride solution, and returning the magnesium chloride solution to be mixed with more fluorspar.

13. A process for the preparation of potassium fluoride from fluorspar, which comprises intermixing ground fluorspar with a 15 to 25 percent stoichiometric excess of an aqueous magnesium chloride solution containing from 18 to 22 percent by weight of magnesium chloride to form a slurry, heating the slurry at a temperature of 250° C. under sufficient pressure to prevent substantial vaporization of water from the slurry so as to convert the calcium fluoride in the fluorspar to calcium chloride and the magnesium chloride to magnesium fluoride, separating the magnesium fluoride from the calcium chloride and inerts, intermixing the recovered magnesium fluoride with a stoichiometric excess in the range of 50 to 150 percent of an aqueous solution containing at least 8 percent by weight of potassium hydroxide at a temperature in the range of 80° to 90° C. to react the magnesium fluoride with the potassium hydroxide to form magnesium hydroxide and a potassium fluoride solution, separating the potassium fluoride solution from the magnesium hydroxide, recovering the potassium fluoride from the solution, adding hydrochloric acid to the magnesium hydroxide to convert the magnesium hydroxide to a magnesium chloride solution, and returning the magnesium chloride solution to be mixed with more fluorspar.

14. A process for the preparation of a metal fluoride which comprises intermixing magnesium fluoride in a stoichiometric excess in the range of 50 to 200 percent with an aqueous solution containing at least 8 percent by weight of a hydroxide selected from the group consisting of sodium hydroxide, lithium hydroxide, barium hydroxide, and strontium hydroxide at a temperature in the range of 80 to 90° C. to react the magnesium fluoride and the hydroxide to form magnesium hydroxide and the metal fluoride, and recovering the metal fluoride from the reacted mixture.

15. A process according to claim 14 wherein the hydroxide is sodium hydroxide.

16. A process according to claim 14 wherein the hydroxide is lithium hydroxide.

17. A process according to claim 14 wherein the hydroxide is barium hydroxide.

18. A process according to claim 14 wherein the hydroxide is strontium hydroxide.

References Cited in the file of this patent

UNITED STATES PATENTS

| | | |
|---|---|---|
| 2,398,743 | Heath et al. | Apr. 16, 1946 |
| 2,690,430 | Anderson | Sept. 28, 1954 |

(Other references on following page)

UNITED STATES PATENTS

| | | | |
|---|---|---|---|
| 2,877,095 | Anderson | | Mar. 10, 1959 |

FOREIGN PATENTS

| | | | |
|---|---|---|---|
| 546,751 | Great Britain | | July 29, 1942 |
| 41,717 | Germany | | Nov. 16, 1887 |

OTHER REFERENCES

Ehret: "Smith's College Chemistry," pages 514, 515, D. Appleton Century Co., Inc., N.Y., 1946, 6th ed.

Mellor: "Comprehensive Treatise on Inorganic and Theoretical Chemistry," vol. 4, page 296, Longmans, Green and Co., N.Y., 1923.